(12) United States Patent
Zhao et al.

(10) Patent No.: US 6,775,400 B1
(45) Date of Patent: Aug. 10, 2004

(54) MEDICAL DIAGNOSTIC ULTRASONIC IMAGING METHOD AND APPARATUS FOR SUPPRESSING ELECTRONIC NOISE

(75) Inventors: Danhua Zhao, Milpitas, CA (US); Constantine Simopoulos, Menlo Park, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/430,591

(22) Filed: Oct. 29, 1999

(51) Int. Cl.$^7$ ................................................ G06K 9/00
(52) U.S. Cl. ................. 382/131; 382/261; 382/278; 600/437
(58) Field of Search ..................... 382/261, 260, 382/275, 128, 130, 294, 278; 600/437–461

(56) References Cited

U.S. PATENT DOCUMENTS

| | | | |
|---|---|---|---|
| 4,397,006 A | * | 8/1983 | Galbraith, Jr. ............... 382/130 |
| 4,558,462 A | * | 12/1985 | Horiba et al. ................. 367/40 |
| 5,060,515 A | * | 10/1991 | Kanda et al. ................. 73/602 |
| 5,090,412 A | * | 2/1992 | Shimazaki .................. 600/443 |
| 5,111,823 A | | 5/1992 | Cohen |
| 5,224,483 A | | 7/1993 | Lipschutz |
| 5,487,306 A | * | 1/1996 | Fortes ......................... 73/597 |
| 5,503,153 A | | 4/1996 | Liu et al. |
| 5,550,935 A | * | 8/1996 | Erdem et al. ................. 348/241 |
| 5,653,234 A | | 8/1997 | Kim et al. |
| 5,734,738 A | * | 3/1998 | Sato ............................ 382/128 |
| 5,991,456 A | * | 11/1999 | Rahman et al. ............. 358/448 |
| 6,014,473 A | * | 1/2000 | Hossack et al. ............. 382/294 |
| 6,067,373 A | * | 5/2000 | Ishida et al. ................. 600/437 |
| 6,287,258 B1 | * | 9/2001 | Phillips ....................... 600/437 |

OTHER PUBLICATIONS

"Vessel Wall Detection and Blood Noise Reduction in Intravascular Ultrasound Imaging" by Angelsen et al. Ultrasonics, Ferroelectrics and Frequency Control, IEEE Transactions on , vol: 43 , Issue: 3 , May 1996. pp.:359–369.*

* cited by examiner

Primary Examiner—Amelia M. Au
Assistant Examiner—Charles Kim

(57) ABSTRACT

An SNR-adaptive method for processing a plurality of post-detection medical diagnostic ultrasonic images determines a cross-correlation parameter from corresponding multi-dimensional regions of first and second post-detection ultrasonic images, and then uses the cross-correlation parameter to suppress electronic noise in ultrasonic image processing. In some cases the multi-dimensional region of the first and second images are registered prior to cross-correlation to compensate for relative movement between the transducer and the imaged tissue between the first and second images.

16 Claims, 5 Drawing Sheets

MEDICAL DIAGNOSTIC ULTRASONIC IMAGING METHOD AND APPARATUS FOR SUPPRESSING ELECTRONIC NOISE

BACKGROUND

The present invention relates to medical diagnostic ultrasonic imaging, and in particular to methods and systems for suppressing electronic noise in such imaging.

Due to the finite penetration depth of acoustic waves in ultrasound imaging, the ultrasound image is often dominated by electronic noise in the far field. Electronic noise also dominates in regions of low echogenicity such as in blood pools.

Several approaches have been used in the past in an attempt to reduce electronic noise in ultrasonic imaging. One approach is to provide the user with manually adjustable depth gain controls. The user can then use these controls to reduce electronic noise in the far field. However, manual optimization of an image to reduce electronic noise is inconvenient, and the effectiveness of such manual optimization is highly dependent on the skills of the user. Furthermore, such manual optimization provides only an average adjustment constrained by the size of the independently adjustable zones, and depth gain controls do not allow two-dimensional variations of gain in order to suppress noise in a subregion having irregular boundaries.

Another prior-art approach is to apply temporal persistence to reduce the visual effect of electronic noise. However, temporal persistence will cause blurring of the image whenever there is motion between the transducer and the imaged tissue.

A third prior-art approach is to limit the maximum gain applied by the imaging system. This approach brings with it a concomitant loss in the maximum penetration depth.

A fourth approach is described in Kim U.S. Pat. No. 5,653,234, in which a single line of acoustic ultrasound data is processed to determine an SNR or rate of change parameter. This parameter is then used to adjust the pass band of a low-pass filter to reduce noise. The disclosed system operates on only one-dimensional (range-varying) signals prior to detection.

The present invention is directed to an improved method and apparatus that automatically determine regions of the image dominated by electronic noise and modify image processing for such regions to improve the resulting image.

SUMMARY

By way of introduction, the embodiments described below provide an SNR-adaptive method for processing a plurality of post-detection ultrasonic images. A cross-correlation parameter is determined from corresponding multi-dimensional regions of at least two post-detection ultrasonic images, and the cross-correlation parameter is then used to suppress electronic noise in ultrasonic image processing. For example, the cross-correlation parameter can be used to adjust a weighting factor that controls gain on a pixel-by-pixel basis, or to adjust the bandwidth of a low-pass filter applied to an ultrasonic image signal. In order to improve the determination of the cross-correlation parameter in the event of tissue motion, the multi-dimensional regions that are to be cross-correlated can be registered to compensate for relative motion between the transducer and the imaged tissue that occurs between the cross-correlated images.

The foregoing paragraph has been provided by way of introduction, and is not intended to limit the scope of the following claims.

DETAILED DESCRIPTION OF THE PRESENTLY PREFERRED EMBODIMENTS

Figure 1:
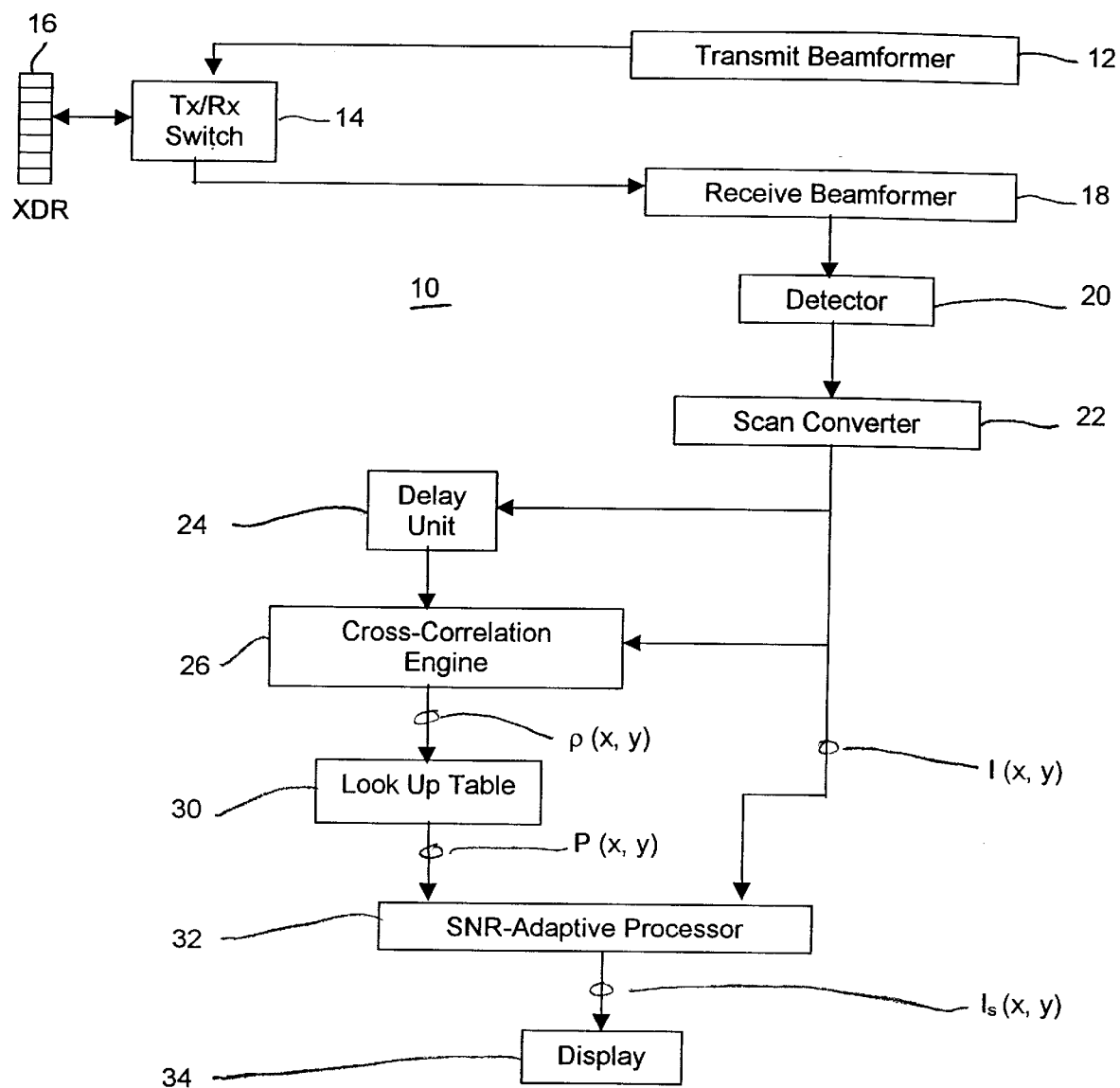
FIG. 1 is a block diagram of a medical diagnostic ultrasonic imaging system that incorporates a preferred embodiment of this invention.

Turning now to the drawings, FIG. 1 shows a block diagram of a medical diagnostic ultrasonic imaging system 10 that incorporates a preferred embodiment of this invention.

The system 10 includes a transmit beamformer 12 that applies transmit waveforms via a transmit/receive switch 14 to a transducer array 16. The transducer array 16 generates ultrasonic signals in response to the transmit waveforms and directs beams of ultrasonic energy into an imaged region. The imaged region typically includes tissues of a subject, and may optionally include contrast agent.

Echoes from the region being imaged are received by the transducer 16 and applied by the transmit/receive switch 14 to a receive beamformer 18. The receive beamformer applies suitable delays and phase shifts to the echo signals to generate beamformed receive signals that are applied to a detector 20 and a scan converter 22.

All of the elements 12 through 22 of the system 10 can be implemented in any suitable form, using either analog or digital technology. These elements of the system 10 have been provided by way of example in order to provide a framework to allow the preferred embodiments of this invention to be described clearly. It is not intended to limit this invention to any specific form of the elements 12 through 22, and many variations are possible. For example, the transmit beamformer 12 and the receive beamformer 18 may be coupled to separate ultrasonic transducers, eliminating the need for a transient/receive switch 14. A wide variety of transducers and beamformers can be used. The transducer 16 can be one, 1.5, or two dimensional, and mechanical ultrasonic focusing techniques can be used in combination with or in substitution for conventional phased array focusing techniques. The system 10 can be used for fundamental or harmonic imaging, with or without contrast agent. The detector 20 can be adapted for B-mode, color Doppler or other imaging.

The image signal I (x, y) generated by the scan converter 22 is applied in parallel to a delay unit 24, a cross-correlation engine 26, and an SNR-adaptive processor 32. The delay unit 24 stores the image data from the previous image. The cross-correlation engine 26 determines cross-correlation coefficients for two consecutive image frames on a pixel-by-pixel basis. For each pixel in the images, the cross-correlation coefficient ρ is calculated by using the values of the pixels in the neighborhood of the central pixel in the following formula:

$$\rho = \frac{\sum_{i,j} A_{ij}B_{ij} - \frac{1}{N}\sum_{i,j} A_{ij}\sum_{i,j} B_{ij}}{\sqrt{\left[\sum_{i,j} A_{ij}^2 - \frac{1}{N}\left(\sum_{i,j} A_{ij}\right)^2\right]\left[\sum_{i,j} B_{ij}^2 - \frac{1}{N}\left(\sum_{i,j} B_{ij}\right)^2\right]}}$$ (EQ1)

where N is equal to the number of pixels in the neighborhood.

In Equation 1 $A_{ij\ and\ Bij}$ represent the value of the pixel (i, j) from two consecutive frames. The summations of Equation 1 are taken over all pixels contained in the neighborhood of the central pixel. Pixels are indexed by the indices i, j, indicating their location along the x and y coordinates of the image plane.

The present invention is not limited to use with two-dimensional correlation coefficients ρ. Rather, the formula of Equation 1 can be generalized to the multi-dimensional case by adding additional indices. For example, in addition to range and azimuth, the elevational direction can be included in the cross-correlation region if the acoustic field is sampled in elevation.

The size of the neighborhood chosen around each pixel is preferably large enough that a robust estimation of the cross-correlation coefficient ρ is achieved. The larger the size of the neighborhood, the more robust the estimate will be. However, the spatial resolution of the method will be degraded as the size of the neighborhood is increased. For this reason, the size of the neighborhood for any particular application is determined as an engineering compromise between robust estimation of ρ and adequate spatial resolution. For one two-dimensional imaging application, typical sizes of the neighborhood of the two-dimensional region around each pixel range from 3×3 to 20×20 pixels.

The cross-correlation coefficient ρ (x, y) generated by the cross-correlation engine 26 is applied as an input to a look up table 30, which maps input values of ρ (x, y) to output values of P (x, y).

Figure 4:
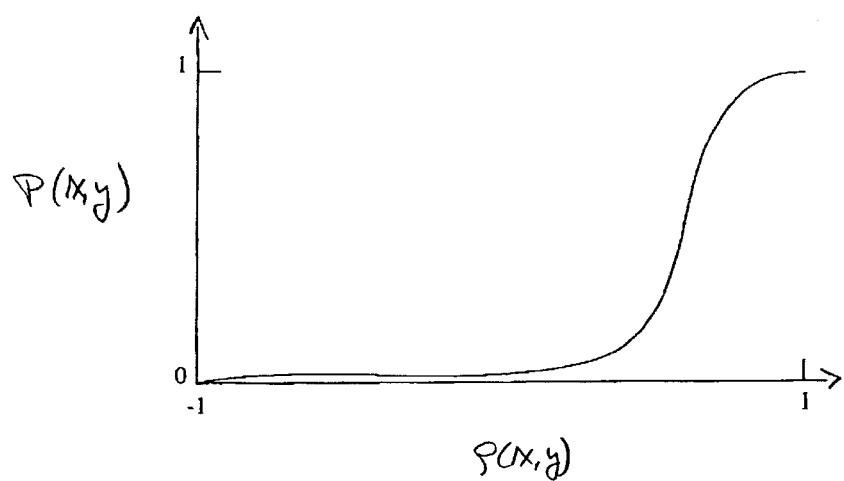
FIG. 4 is a graph illustrating operation of the look up table 30 of FIG. 1.

One alternative function that can be used in the look up table 30 is shown in FIG. 4. The exact shape of the function is not critical. The important features are that pixels with cross-correlations near one have a substantially different value of P (x, y) than pixels with cross-correlation values near zero or with negative cross-correlation values. In this embodiment, a monotonically increasing function is preferred that assigns P(x, y) a value near 1 when ρ (x, y) is near 1, and assigns P (x, y) a value near 0 when ρ (x, y) is between −1 and 0. In alternative applications the function stored in the look up table 30 can be either a direct function as shown in FIG. 4 or an inverse function. The look up table 30 is not required in all cases, and in some alternatives the parameter P (x, y) can be proportional to or even equal to the cross-correlation coefficient ρ (x, y).

The parameter P (x, y) and image signal I (x, y) are applied to an SNR-adaptive processor 32 that varies some aspect of the signal processing applied to the image signal I (x, y) as a function of P (x, y) in order to suppress electronic noise in the resulting signal $I_s$ (x, y). This resulting image signal $I_s$ (x, y) is then displayed on a display 34.

Figure 2:
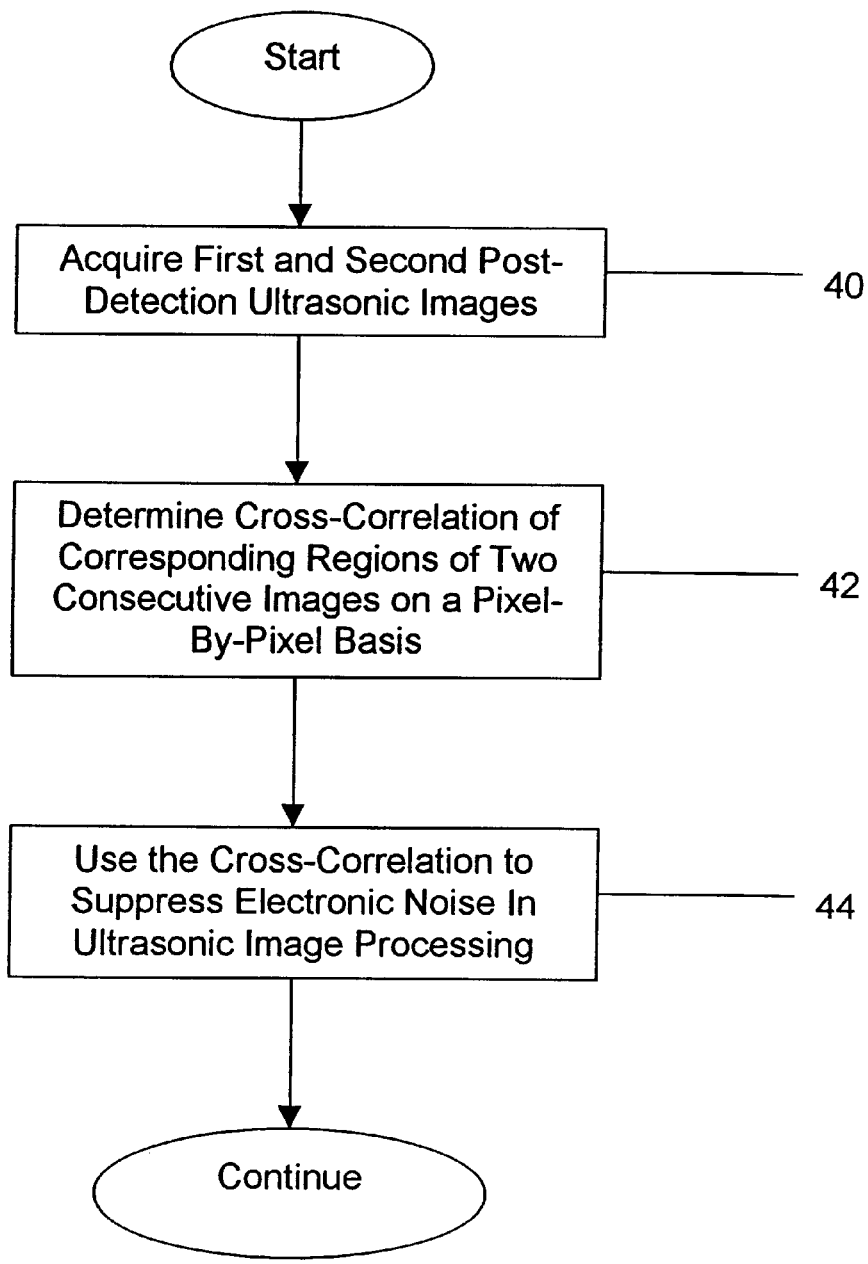
FIG. 2 is a block diagram of a method performed by the system of FIG. 1.

FIG. 2 provides a flow chart of a method implemented with the system 10 of FIG. 1. First and second post-detection ultrasonic images are acquired at 40, and cross-correlation parameters of two corresponding regions of the images are determined at 42. Then the cross-correlation parameters are used at 44 to suppress electronic noise in ultrasonic image processing.

In the event that there is relative motion between the tissue being imaged and the transducer, such motion causes decorrelation which can result in the misidentification of signal pixels as noise pixels. To ameliorate this potential problem, a number of techniques can be used.

One approach is to acquire the two image frames that are cross-correlated using interleaving techniques. For example, first and second image frames can be acquired for cross-correlation using first and second consecutive transmit events to acquire a first scan line for the first and second image frames, respectively; third and fourth consecutive transmit events to acquire a second scan line for the first and second image frames, respectively; and so forth. In one specific example, each scan line $L_i$ of the first image frame is acquired at time $t_{2i}$, and each scan line $L_i$ of the second image frame is acquired at time $t_{2i+1}$, where i=0, 1, 2, . . . N. In this way tissue motion between the first and second image signals is minimized.

Figure 3:
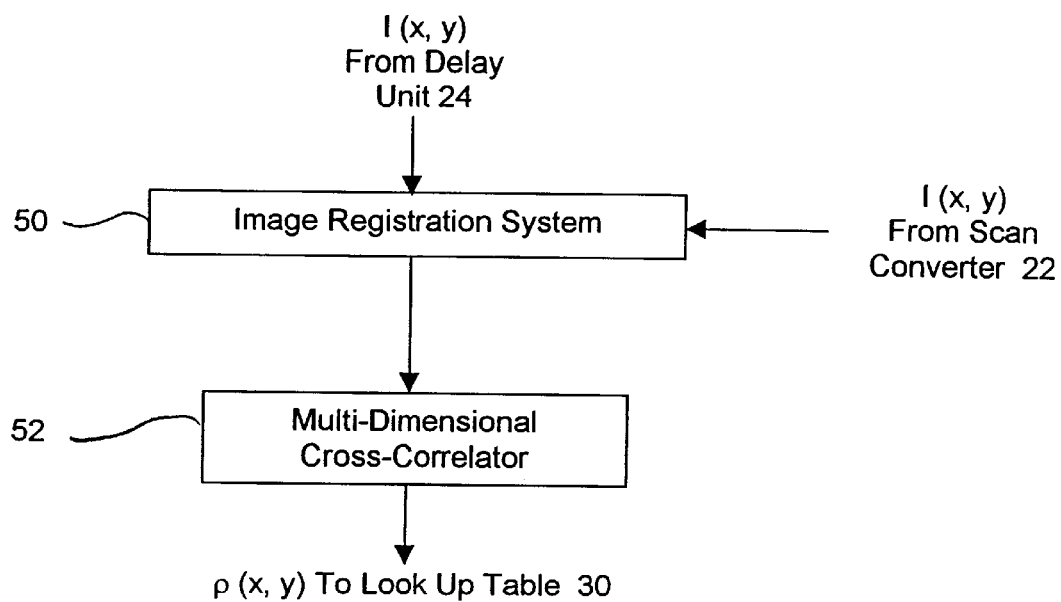
FIG. 3 is a more detailed block diagram of the cross-correlation engine 26 of FIG. 1.

As another alternative, the cross-correlation engine of FIG. 1 can include an image registration system 50 as shown in FIG. 3. The image registration system 50 detects the motion between the image signal from the delay unit 24 and the image signal from the scan converter 22 by calculating the two-dimensional cross-correlation between a region of the first frame and a region of the second frame. The size of the regions used for this cross-correlation should be large enough to include a few resolution cells in each direction. Cross-correlations are calculated for various positions of the first frame with respect to the second frame along each axis. The direction and magnitude for the frame-to-frame displacement that provides maximum correlation is found and is associated with the local motion of tissue. This operation can be done for a few regions of high signal to noise ratio (SNR), or alternately in a predetermined set of locations in the images. This image registration method is computation intensive, but adequate computational power is already available on prior-art systems that join multiple coplanar frames to form an extended field of view. See, for example, the discussions in U.S. patent applications Ser. Nos. 08/916, 585 and 09/195,986 and U.S. Pat. No. 5,557,286 for disclosures of alternative methods that can be used to register two image frames.

Once the local displacement vectors have been found that result in the desired registration of the two images, these local displacement vectors are then used to transform one of the images to remove the effects of frame-to-frame motion. The registered images are then applied to a multi-dimensional cross-correlator 52 that operates as described above to generate the cross-correlation coefficient ρ (x, y).

Figure 5:
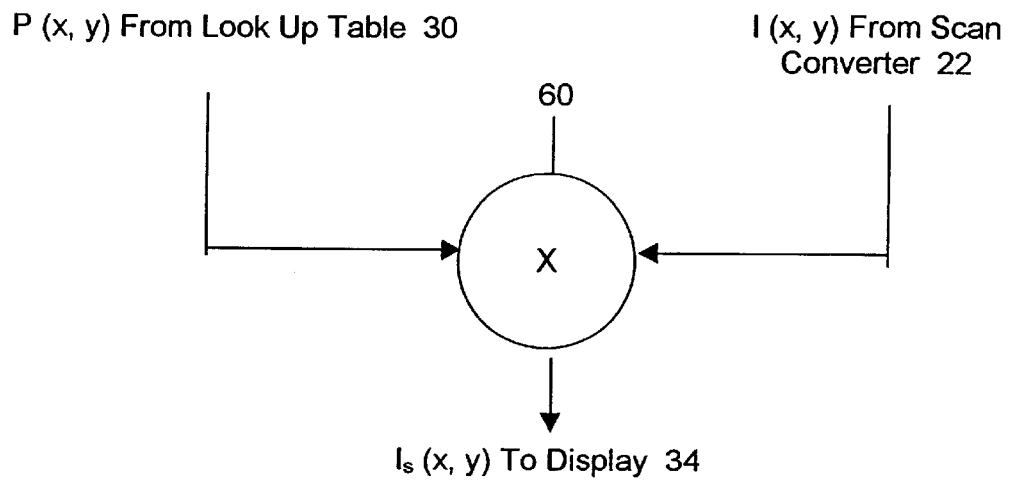
FIG. 5 is a block diagram of one circuit suitable for use in the SNR-adaptive processor 32 of FIG. 1.

The SNR-adaptive processor 32 of FIG. 1 can take many forms, depending upon the application. As shown in FIG. 5, in one form the SNR-adaptive processor includes a multiplier 60 that modulates the image signal I (x, y) with the parameter P (x, y) generated by the look up table 30 of FIG. 1. The function illustrated in FIG. 4 is particularly well suited for use in the embodiment of FIG. 5, and in this embodiment the parameter P (x, y) can be considered as an example of a weighting or gain function that is automatically determined on a pixel-by-pixel based as appropriate to suppress system electronic noise in the resulting signal $I_s$ (x, y). Often when the embodiment of FIG. 5 is used, the function provided by the look up table 30 is selected to provide a gain of one for pixels with a cross-correlation near one and a gain substantially lower than one for pixels having a cross-correlation value near zero or negative.

Figure 6:
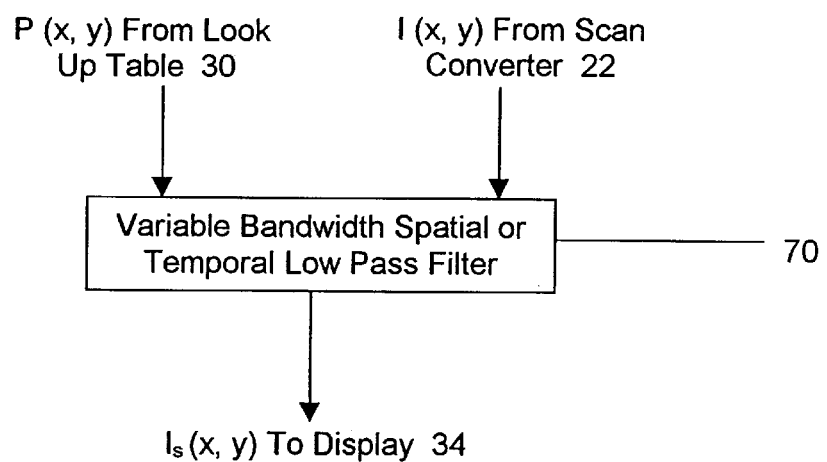
FIG. 6 is a block diagram of another circuit suitable for use in the SNR-adaptive processor 32 of FIG. 1.

FIG. 6 shows another alternative for the SNR-adaptive processor of FIG. 1. In FIG. 6 the image signal I (x, y) is applied to a variable bandwidth spatial or temporal low-pass filter 70. The bandwidth of the filter 70 is adjusted as a function of the parameter P (x, y). Thus, the bandwidth of the filter 70 is adaptively varied on a pixel-by-pixel basis in accordance with the cross-correlation coefficient ρ (x, y) for the associated pixel. When the cross-correlation coefficient ρ (x, y) is close to one, the bandwidth of the filter 70 is preferably matched to the bandwidth of the image signal I (x, y). When the cross-correlation coefficient ρ (x, y) is close to zero or negative, the bandwidth of the filter 70 is reduced in order to suppress electronic noise in the filtered signal $I_s$ (x, y).

Figure 7:
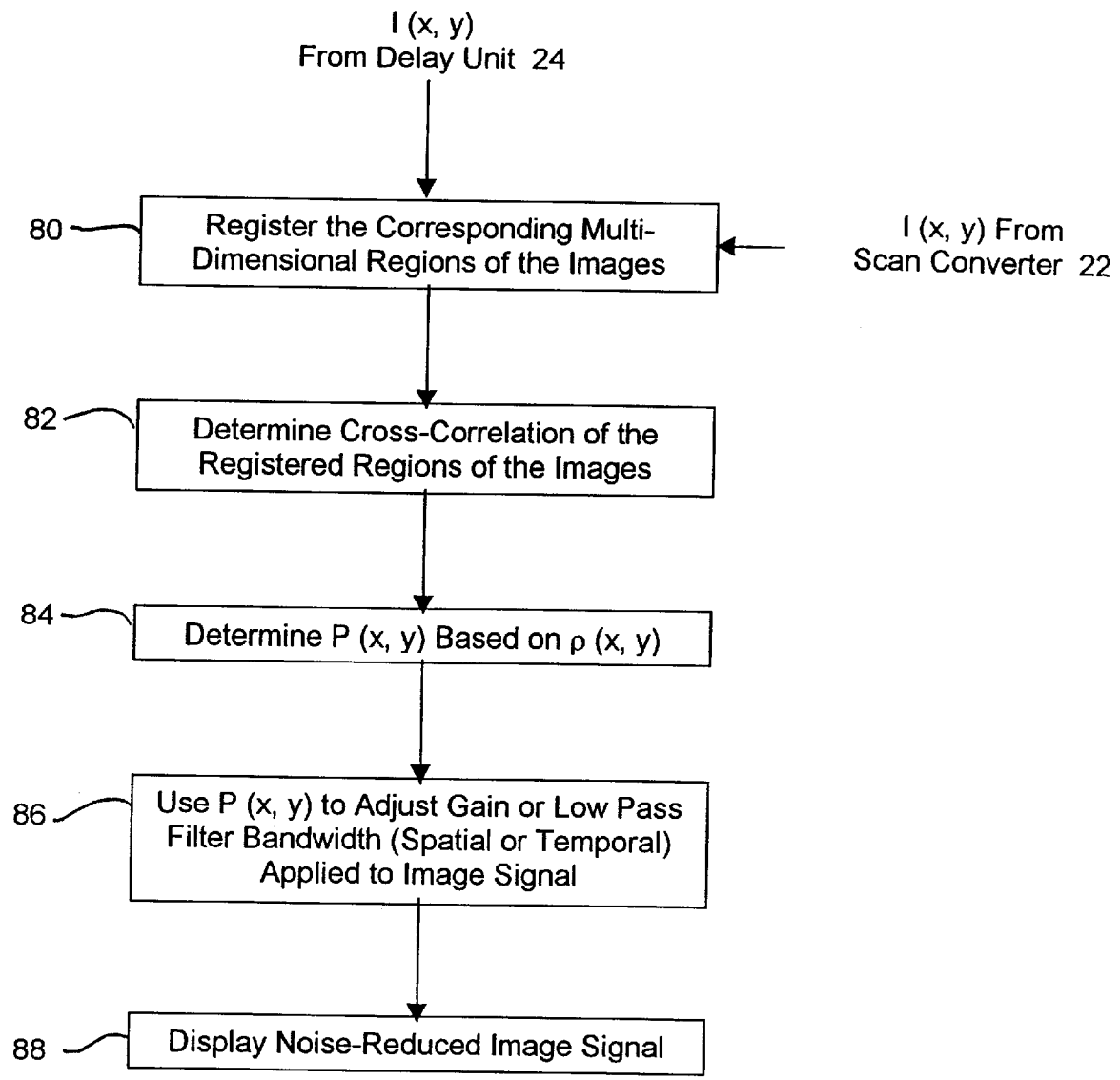
FIG. 7 is a more detailed flow chart of method performed by the system of FIG. 1.

FIG. 7 provides a more detailed flow chart of the operation of the system 10 of FIG. 1, for the case where the cross-correlation engine 76 is embodied as shown in FIG. 3, and the SNR-adaptive processor 32 is embodied as shown in FIGS. 5 or 6. As shown at block 80 in FIG. 7, the corresponding multi-dimensional regions of two images, one from the delay unit 24 and the other from the scan converter 22, are registered to reduce or eliminate tissue or transducer motion artifacts. Then, at block 82, the cross-correlation coefficient is determined for the registered regions of the two images. At block 84 the cross-correlation parameter P (x, y) is determined based on ρ (x, y), and at block 86 the parameter P (x, y) is used to adjust either the gain or the low-pass filter bandwidth (spatial or temporal) applied to the image signal. At block 88 the noise-reduced image signal is displayed.

This method provides the advantage that the electronic noise level is automatically detected, and then suppressed in regions of arbitrarily-shaped boundaries. Blurry images such as those sometimes associated with long persistence times are avoided, and penetration depth is not compromised.

Of course, many changes and modifications can be made to the preferred embodiments described above. For example, the parameter P (x, y), once generated from one pair of image frames, can be used to process additional image frames.

Additionally, the SNR-adaptive processor 32 can take many forms, and the examples discussed above are not intended to be limiting. For example, the parameter P (x, y) can be used to select any suitable response function, whether now known or later developed.

Of course, the function stored in the look up table 30 is selected as appropriate for the particular SNR-adaptive processor being used. Depending on the SNR-adaptive processor in use, the function stored in the look up table 30 can be either a direct function (e.g., the function FIG. 4) or an inverse function. The look up table 30 is not required in all cases, and in some alternatives the parameter P (x, y) can be proportional to or even equal to the cross-correlation coefficient ρ (x, y). Additionally, computational techniques or analog circuits can be used to generate P (x, y) from ρ (x, y), instead of the illustrated look up table.

Additionally, the various elements described above can be implemented using either analog or digital techniques, and these elements can be situated at many points on the receive signal processing path using a wide variety of system hardware.

The term "circuit" is intended broadly to encompass both analog and digital circuits, including programmable computers. First and second circuits may be implemented by the same hardware at different times when a computer is executing different program sequences.

The term "function of" is intended broadly to encompass both direct and indirect functions. Thus, a parameter is said to be a function of a first variable whether or not it is also a function of a second variable. Functions can be linear, nonlinear, reciprocal, or the like, and can be implemented in any desired computational, look up table, or selection approach.

The term "generate" or "determine" is intended broadly to encompass a wide variety of techniques, including look up table techniques, selection techniques, and calculation techniques, whether analog or digital.

The term "image signal" is intended broadly to encompass two-dimensional or greater-dimensional images including one or more frames or portions of a frame of image data. The term "image signal" is applied to post-detection receive signals, whether before or after scan conversion.

The term "SNR" is intended broadly to encompass many measures that indicate the noisiness of a signal. Thus, SNR may be a function of a variance, variance normalized by intensity, standard deviation as well as signal level.

The term "cross-correlation parameter" is intended broadly to encompass a cross-correlation coefficient such as the parameter ρ described above or a parameter such as the parameter P described above.

The term "multi-dimensional" signifies two or more spatial dimensions.

The foregoing detailed description has discussed only a few of the many forms that the present invention can take. For this reason, this detailed description is intended only by way of illustration and not by way of limitation. It is only the following claims, including all equivalents, that are intended to define the scope of this invention.

What is claimed is:

1. An SNR-adaptive method for processing a plurality of post-detection medical diagnostic ultrasonic images, said method comprising:
    (a) determining a cross-correlation parameter from corresponding multidimensional regions of first and second post-detection medical diagnostic ultrasonic images;
    (b) using the cross-correlation parameter to suppress electronic noise in ultrasonic image processing; and
    (c) repeating (a) and (b) on a pixel-by-pixel basis, wherein a different suppression is provided in (b) for different regions within a same image, the multidimensional regions being a neighborhood of pixels around each pixel of the pixel-by-pixel basis.

2. The method of claim 1 wherein the act of using the cross-correlation parameter comprises:
    (b1) determining a weighting factor as a function of the cross-correlation factor; and
    (b2) applying the weighting factor to an ultrasonic image signal.

3. The method of claim 1 wherein the act of using the cross-correlation parameter comprises:
    (b1) adjusting a filter as a function of the cross-correlation factor; and
    (b2) applying the filter to an ultrasonic image signal.

4. The method of claim 1 wherein the act of determining a cross-correlation parameter comprises:
    (a1) registering the multi-dimensional region of the first and second post-detection ultrasonic images to compensate for at least one of transducer motion and tissue motion between the first and second post-detection ultrasonic images.

5. An SNR-adaptive system for processing a plurality of post-detection medical diagnostic ultrasonic images, said system comprising:

a cross-correlator operative to determine a cross-correlation parameter from corresponding multi-dimensional regions of first and second post-detection medical diagnostic ultrasonic images on a pixel-by-pixel basis, the multidimensional regions being a neighborhood of pixels around each pixel of the pixel-by-pixel basis;

an SNR-adaptive processor responsive to the cross-correlation parameter and operative to suppress electronic noise in at least one ultrasonic image differently for different regions of the at least one ultrasound image.

6. The invention of claim 5 wherein the SNR-adaptive processor comprises:

a circuit for generating a weighting factor as a function of the cross-correlation parameter; and a circuit for applying the weighting factor to at least one ultrasonic image.

7. The invention of claim 5 wherein the SNR-adaptive processor comprises a filter applied to at least one ultrasonic image, said filter having a bandwidth that is varied in response to the cross-correlation parameter.

8. The invention of claim 7 wherein the filter comprises a low-pass temporal filter.

9. The invention of claim 7 wherein the filter comprises a low-pass spatial filter.

10. The invention of claim 5 wherein the cross-correlator comprises a circuit operative to register at least the corresponding regions of the first and second images prior to determination of the cross-correlation parameter to compensate for at least one of transducer motion and tissue motion between the first and second images.

11. The method of claim 1 further comprising:

(c) compensating for at least one of transducer motion and tissue motion between the first and second post-detection medical diagnostic ultrasonic images, and then performing acts (a) and (b).

12. The invention of claim 5 wherein the cross-correlator comprises a circuit operative to compensate for at least one of transducer motion and tissue motion between the first and second post-detection medical diagnostic ultrasonic images, and then determine the cross-correlation parameter.

13. The method of claim 1 wherein the multidimensional regions are from 3×3 to 20×20 pixels.

14. The method of claim 1 wherein the cross-correlation parameter is:

$$\rho = \frac{\sum_{i,j} A_{ij}B_{ij} - \frac{1}{N}\sum_{i,j} A_{ij}\sum_{i,j} B_{ij}}{\sqrt{\left[\sum_{i,j} A_{ij}^2 - \frac{1}{N}\left(\sum_{i,j} A_{ij}\right)^2\right]\left[\sum_{i,j} B_{ij}^2 - \frac{1}{N}\left(\sum_{i,j} B_{ij}\right)^2\right]}}.$$

15. The invention of claim 5 wherein the multidimensional regions are from 3×3 to 20×20 pixels.

16. An SNR-adaptive method for processing a plurality of post-detection medical diagnostic ultrasonic images, said method comprising:

(a) determining a cross-correlation parameter from corresponding multi-dimensional regions of first and second post-detection medical diagnostic ultrasonic images; and (b) using the cross-correlation parameter to suppress electronic noise in ultrasonic image processing;

wherein the cross-correlation parameter is:

$$\rho = \frac{\sum_{i,j} A_{ij}B_{ij} - \frac{1}{N}\sum_{i,j} A_{ij}\sum_{i,j} B_{ij}}{\sqrt{\left[\sum_{i,j} A_{ij}^2 - \frac{1}{N}\left(\sum_{i,j} A_{ij}\right)^2\right]\left[\sum_{i,j} B_{ij}^2 - \frac{1}{N}\left(\sum_{i,j} B_{ij}\right)^2\right]}}.$$

\* \* \* \* \*